United States Patent [19]

Eichholz et al.

[11] 4,079,980
[45] Mar. 21, 1978

[54] DEVICE FOR TRANSPORTING ANNULAR RUNNING STRIPS FOR PNEUMATIC TIRES

[75] Inventors: Werner Eichholz; Gerd Krebs, both of Hamburg, Germany

[73] Assignee: Phoenix Gummiwerke AG, Hamburg, Germany

[21] Appl. No.: 659,284

[22] Filed: Feb. 19, 1976

[30] Foreign Application Priority Data

Feb. 27, 1975   Germany ............................. 2508495

[51] Int. Cl.² ............................................... B66C 1/46
[52] U.S. Cl. ............................... 294/67 BA; 294/86 R
[58] Field of Search ...................... 294/63 A, 86 R, 90, 294/93, 99 R, 67 BA; 214/1 B, 1 BB; 269/22

[56] References Cited

U.S. PATENT DOCUMENTS

| | | | |
|---|---|---|---|
| 2,752,191 | 6/1956 | Pierce | 294/93 |
| 2,894,780 | 7/1959 | Hollander et al. | 294/93 |
| 3,118,555 | 1/1964 | Bent et al. | 294/93 X |
| 3,400,967 | 9/1968 | Heller et al. | 294/93 |
| 3,714,770 | 2/1973 | Rothke | 294/93 X |
| 3,780,492 | 12/1973 | Corderoy | 294/93 X |
| 3,915,311 | 10/1975 | Ball et al. | 294/93 X |

Primary Examiner—Johnny D. Cherry
Attorney, Agent, or Firm—Allison C. Collard

[57] ABSTRACT

A device for transporting annular raw belt-supported running strips for pneumatic tires consists of a gripping device fixed to a supporting ring. The device can be shifted sidewise and adjusted radially. According to the invention the gripping device consists of a ring which has a U-shaped axial cross-section, which is closed up to radial center, which consists of a viscous elastic plastic substance and which can change its shape radially inwardly by air pressure.

6 Claims, 3 Drawing Figures

DEVICE FOR TRANSPORTING ANNULAR RUNNING STRIPS FOR PNEUMATIC TIRES

This invention relates to a device for transporting annular raw belt-supported running strips for pneumatic tires, generally known as Kfz tires. The device consists of a gripping device which can be shifted sidewise and adjusted radially and which is fixed to a supporting ring.

During the manufacture of raw pieces for belt tires, the bodies and the running strips including underlying belts are produced in separate operations and in separate machines. In the simplest case the transportation of the running strip with belt can take place by hand from the supply stack to the device for producing finished raw tires. According to newer methods the transportation of a belt to the raw pneumatic tire which has already the shape of a torus, can take place by a supporting ring which is shiftable sidewise. This ring has radially adjustable holding means which as a rule consist of a plurality of plates which can be radially adjusted mechanically or hydraulically. They can thus grip the annular belt possibly with running strips and bring it upon the torus-shaped body. These gripping devices require considerable expenditure and they can be easily damaged with the result that changes in the shaping of belts and running strips can take place.

An object of the present invention is the provision of a device of the described type which can operate without disturbances, which requires a small technical expenditure and which will grip the raw running strip with pressure which is as small as possible but barely sufficient.

Other objects of the present invention will become apparent in the course of the following specification.

In the accomplishment of the objectives of the present invention it was found desirable to make the gripping device as a ring which has a U-shaped axial cross section, which is closed up to the radial center, which consists of a viscous elastic plastic substance and which can change its shape radially inwardly by air pressure.

A ring of this type shaped substantially as a flat U can change its shape radially inwardly by operable air pressure so that it will be just sufficient to grip most protectively the belt and/or running strip, to hold them and to transport them. In accordance with the present invention it is advantageous to make the ring of polyurethane with an E-modulus of at least about 500Kp/mm². When the wall thickness is suitable this material can be so pressed by air pressure, that an annular shape will remain.

According to an advantageous embodiment of the present invention, the ring is clamped to the supporting ring at its edges with widened flanges. This makes possible in a simple manner a sealing of the gripping ring relatively to the supporting ring.

The gripping ring is so arranged upon the inner side of the supporting ring that it has a free radially inwardly directed moving capacity. To provide an advantageous cross-sectional shape of the gripping ring it is preferable to provide the sides of the ring with annular sharp grooves. Then the changes in shape can be predetermined in advance to a great extent. It is of importance that the central annular part of the gripping ring should be able to keep its substantially cylindrical shape. This avoids a negative action upon the surface of the belt and/or running strip, since a substantially equal surface pressure is produced in the surface parts of the ring. In an advantageous embodiment of the present invention using sharp grooves, these grooves upon the flanges lie alternately outwardly, inwardly and outwardly. Then the sides of the ring are inwardly bent even in case of small air pressure and can fixedly lie as base upon the carrying ring. Then the bending becomes gradually smaller when air pressure is increased.

To make possible a use for different diameters of belts and/or running strips for tires, it is advantageous to limit the extension capacity of the sides by adjustable stops located on both sides. These stops can fix in advance the smallest diameter of the gripping ring. This has an advantageous protective effect upon the treatment of running strips and/or belts.

In this connection it is also advantageous to make the ring zones limited by the sharp grooves of different widths. Then the stops find a wide supporting surface.

Since the ring can operate with smaller as well as higher air pressure the untensioned condition of the ring lies substantially in the middle between the extreme positions. A diminished air pressure increases the circumference of the gripping ring. By increased air pressure the circumference of the ring is diminished relatively to this middle position.

The invention will appear more clearly from the following detailed description when taken in connection with the accompanying drawing showing by way of example only, a preferred embodiment of the inventive idea.

Figure 1:
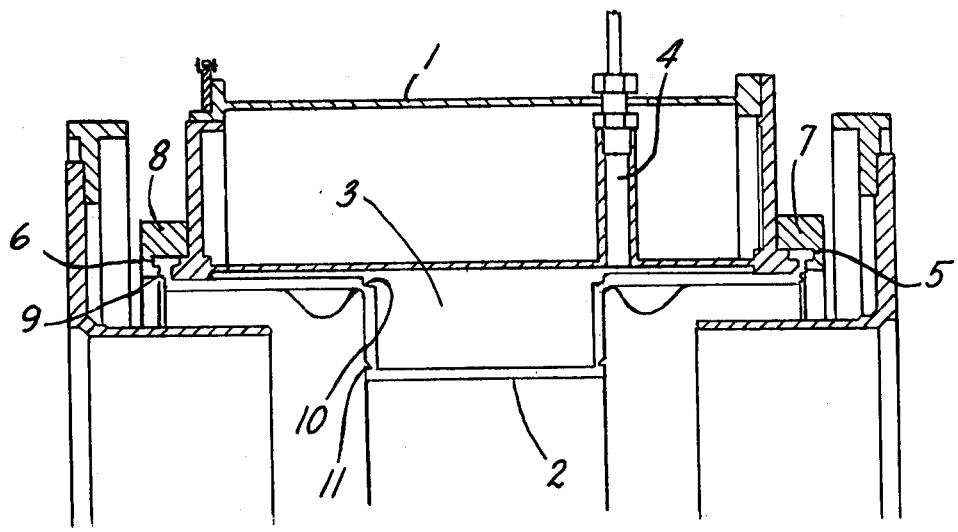
FIG. 1 is a partial cross-section through a carrying ring and a gripping ring.

FIG. 1 shows a section through a supporting ring 1 and a ring 2 constructed as a gripper. The supporting ring 1 is fixed to a shifting rail (not shown). Thus the entire device can be shifted selectively backwards and forwards between the device for making belts and the device for winding tires. An air space 3 is located between the supporting ring 1 and the gripping ring 2. The air space can be subjected to lesser or greater air pressure by a conduit 4. When air pressure is less the ring 2 assumes the shape shown in FIG. 1. The edges of the ring 2 have flanges 5, 6 which are connected airtightly by further rings 7, 8 with the supporting ring 1. The flanks of the ring 2 have deep grooves 9, 10 and 11 used to operate the shape of the ring 2. These grooves are provided upon both flanks.

Figure 2:
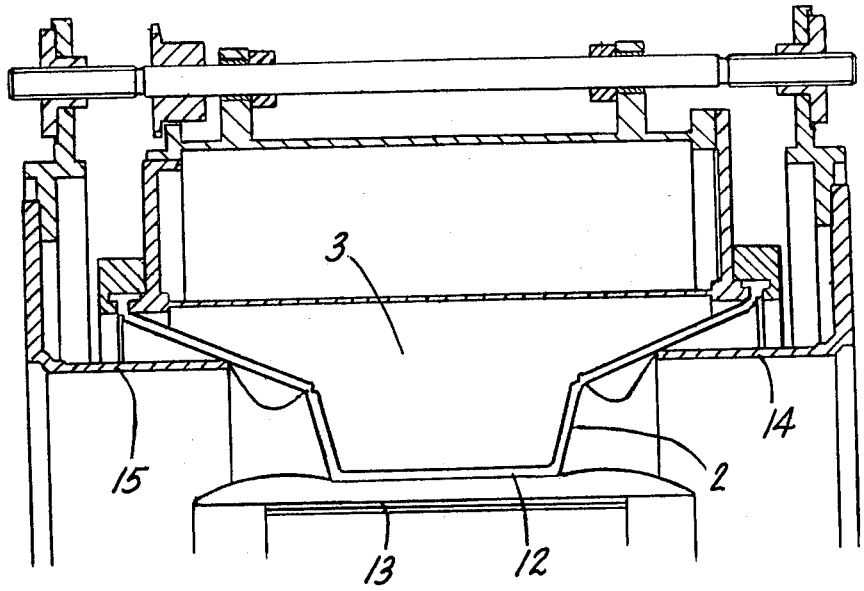
FIG. 2 is a section similar to that of FIG. 1 but illustrating the use of greater air pressure.
Figure 3:
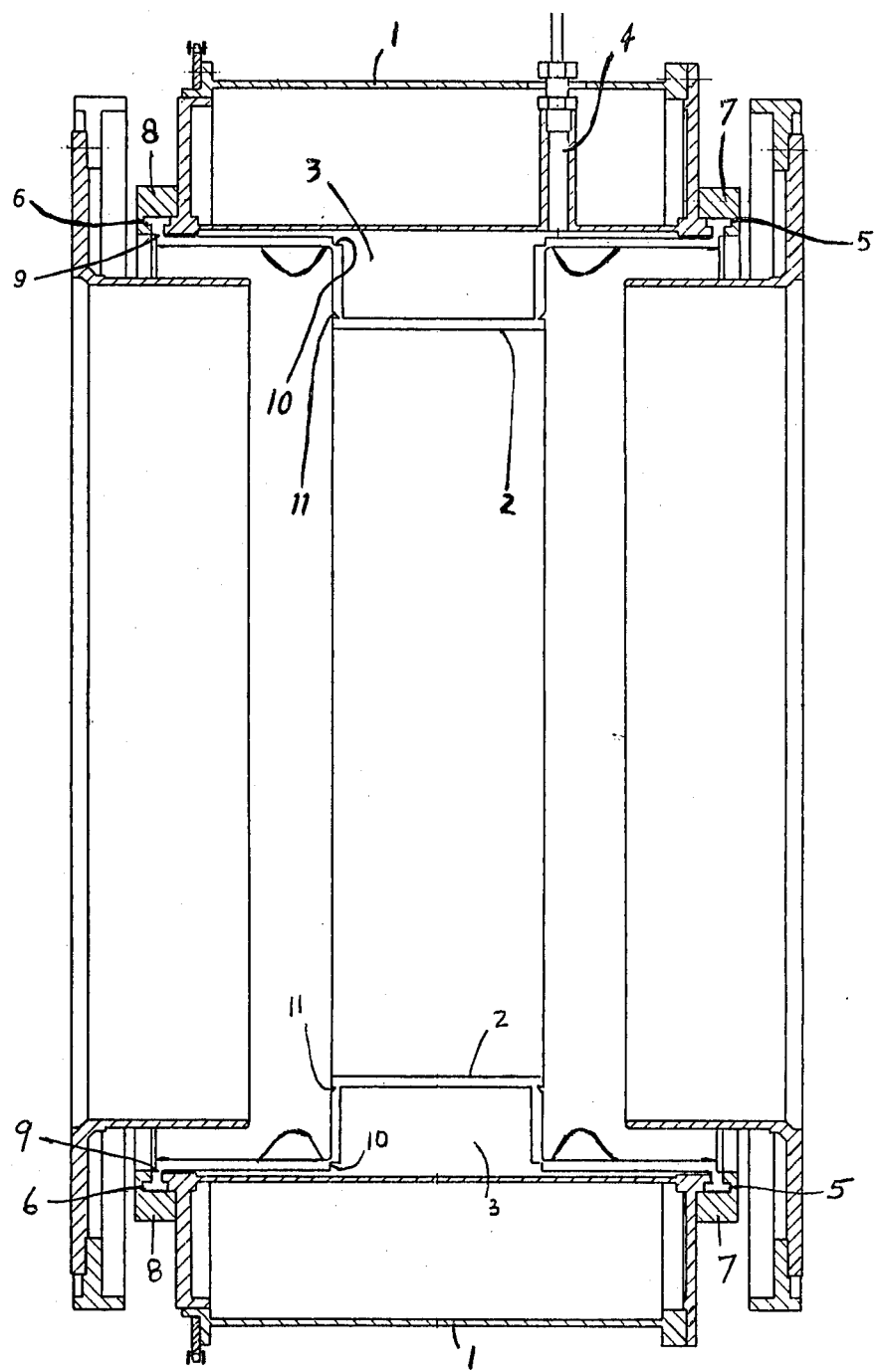
FIG. 3 is a full cross-sectional view, similar to that of FIG. 1.

FIG. 2 is distinguished from FIG. 1 in that FIG. 2 shows the space 3 as having as increased air pressure. This extends the flanks of the ring 2 while the diameter of the ring 2 is diminished, so that its central part 12 presses against the running strip 13. This holds the belt and the running strip. In this condition transportation is possible.

The stops 14 and 15 are moved to the flanks of the ring 2 so that the end position of the ring 2, as illustrated, can be considered as constituting the best possible support.

What is claimed is:

1. A device for transporting annular raw belt-supported running strips for pneumatic tires comprising:
   a generally cylindrically-shaped support having an inner surface and a conduit extending therethrough opening onto said inner surface which permits the transmission of pressurized air thereto; and a radially inwardly inflatable annular jacket, having a generally U-shaped cross-section, fabricated from an elastic plastic material, having a substantially cylindrical base wall and two annular sidewalls, each of said sidewalls having a lower edge which is secured to one of the opposite edges of said base wall and an upper edge which is secured to said inner surface of said support outwardly of the conduit opening therein, each of said sidewalls having two outwardly-opening, annularly-extending grooves formed therein adjacent the edges thereof and one inwardly-opening, annularly-extending groove formed therein between said edges thereof which define annular zones separated by articulated joints, said joints cooperating, upon admission of pressurized air into said jacket, to permit pivotal extension of said annular zones to expand said jacket radially inwardly while maintaining the cylindrical shape of said base wall thereby providing a substantially flat, cylindrical and continuous gripping surface for supporting the annular strip therebetween.

2. A device for transporting annular raw belt-supported running strips for pneumatic tires comprising:

a generally cylindrically-shaped support having an inner surface and a conduit extending therethrough opening onto said inner surface which permits the transmission of pressurized air thereto; and a radially inwardly inflatable annular jacket, having a generally U-shaped cross-section, fabricated from polyurethane having an E-modulus of at least 500 Kp/mm², having a substantially cylindrical base wall and two annular sidewalls, each of said sidewalls having a lower edge which is secured to one of the opposite edges of said base wall and an upper edge which is secured to said inner surface of said support outwardly of the conduit opening therein, each of said sidewalls also having two outwardly-opening, annularly-extending grooves formed therein adjacent the edges thereof and one inwardly-opening, annularly-extending groove formed therein between said edges thereof which define annular zones separated by articulated joints, said joints cooperating, upon admission of pressurized air into said jacket, to permit pivotal extension of said annular zones to expand said jacket radially inwardly while maintaining the cylindrical shape of said base wall, thereby providing a substantially flat, cylindrical and continuous gripping surface for supporting the annular strip therebetween.

3. A transporting device according to claim 2, wherein said annular jacket has widened flanges upon the upper edges of said sidewalls thereof, which are clamped to said inner surface of said support.

4. A transporting device according to claim 2, wherein said grooves define annular zones of different widths in said sidewalls.

5. A transporting device according to claim 2, additionally comprising two adjustable abutments located on opposite sides of said annular jacket to limit the extension of said sidewalls.

6. A transporting device according to claim 2, wherein the base wall of said jacket is maintained in a tension-free condition.

* * * * *